(12) United States Patent
Lee

(10) Patent No.: US 7,388,547 B2
(45) Date of Patent: Jun. 17, 2008

(54) ANTENNA FOR PORTABLE TERMINAL

(75) Inventor: Jae-Ryong Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/493,508

(22) Filed: Jul. 26, 2006

(65) Prior Publication Data

US 2007/0024509 A1 Feb. 1, 2007

(30) Foreign Application Priority Data

Jul. 26, 2005 (KR) .................. 10-2005-0067609

(51) Int. Cl.
*H01Q 1/24* (2006.01)
*H01Q 1/38* (2006.01)
*H01Q 1/36* (2006.01)

(52) U.S. Cl. .................. 343/702; 343/700 MS

(58) Field of Classification Search ......... 343/700 MS, 343/702, 895
See application file for complete search history.

(56) References Cited

U.S. PATENT DOCUMENTS

| 4,328,399 | A | 5/1982 | Perks et al. ............ 179/90 K |
| 5,561,437 | A | 10/1996 | Phillips et al. .............. 343/702 |
| 5,710,987 | A | 1/1998 | Paulick ..................... 455/90 |
| 6,016,126 | A | 1/2000 | Holshouser ................. 343/702 |
| 6,954,181 | B2 * | 10/2005 | Park et al. .................. 343/702 |
| 2004/0077373 | A1 * | 4/2004 | Choi et al. ............... 455/550.1 |
| 2005/0222961 | A1 * | 10/2005 | Staib et al. ................... 705/64 |

FOREIGN PATENT DOCUMENTS

| EP | 1 450 385 | 8/2004 |
| KR | 10-2004-0049984 | 6/2004 |
| KR | 10-2006-0087331 | 8/2006 |

* cited by examiner

*Primary Examiner*—Shih-Chao Chen
(74) *Attorney, Agent, or Firm*—The Farrell Law Firm, PC

(57) ABSTRACT

An antenna includes a keypad assembly having a plurality of key buttons, a main antenna unit, and a second antenna unit where a predetermined pattern is formed. The second antenna unit is interposed between components of the keypad assembly. Accordingly, a separate installation space for the antenna radiator is not required in the main board, thus contributing to volume reduction of the terminal. Also, since an installation area corresponding to the total area of the keypad assembly is available, antennas for different bands may be installed.

21 Claims, 4 Drawing Sheets

ANTENNA FOR PORTABLE TERMINAL

PRIORITY

This application claims priority under 35 U.S.C. § 119 to an application entitled "Antenna For Portable Terminal" filed in the Korean Intellectual Property Office on Jul. 26, 2005 and assigned Serial No. 2005-67609, the contents of which are incorporated herein by reference.

BACKGROUND OF THE INVENTION

1. Field of the Invention

The present invention relates to an antenna for a portable terminal, and more particularly, to an antenna for a portable terminal, in which an antenna occupying a relatively large area can be efficiently installed without increasing the volume of the terminal.

2. Background of the Prior Art

With the rapid spread of portable terminals, terminal manufacturers have made an effort to produce slim and lightweight terminals having various functions so as to satisfy users' demands. For example, the user can take a photograph using a small-sized camera module mounted on the terminal and can listen to music using an MP3 player mounted on the terminal. These functions cause the terminal to increase in volume due to the installation of the corresponding devices. Terminal manufacturers have made many efforts to solve these problems and implement various additional functions.

Among the additional functions of the terminal, a near field communication (NFC) technology has become commercialized. Recently, terminals having a 2.4-GHz Bluetooth™ function for NFC have been introduced. Examples of the Bluetooth™ function include data communication between terminals, and wireless communication between an ear microphone and a terminal. To perform the above-described Bluetooth™ function, a Bluetooth™ chip must be mounted on the terminal and a radiator must also be installed in the terminal.

The Bluetooth™ radiator must be separated from an RF radiator used for data transmission and reception. For example, the Bluetooth™ radiator is mounted on an RF board in a Surface Mount Device (SMD) type. A chip antenna and a plate type monopole antenna have been widely used as the Bluetooth™ radiator.

Also, terminals having the NFC function for electronic payment, Peer-to-Peer (P2P) communication, and a card reader function have been introduced. The above-described NFC function must use separate devices, and a separate antenna (other than an antenna radiator for communication) is used for an RF communication with a payment device. To use the above-described NFC function, it is necessary to mount smart Integrated Circuits (ICs), Oscillators (OSCs), and other passive elements on a main board of the terminal. Also, a low-frequency (about 13.56 MHz) antenna radiator for NFC is required. Since the low-frequency antenna radiator is bulky (about 30 mm×50 mm), it has been generally built in a battery pack of the terminal. In addition, since the NFC antenna is bulky, it is installed over an entire rear surface of the battery pack that is a power supply of the terminal. Therefore, an expensive ferrite layer must be used for avoiding the interference between the antenna and the conductive battery cell.

Therefore a separate antenna in addition to an existing antenna for communication, must be installed in the Bluetooth™ antenna or NFC antenna radiator, thus increasing the size of the terminal. Consequently, the conventional antenna does not satisfy the trend toward slim profile, lightweight and multi-function portable terminal.

SUMMARY OF THE INVENTION

The present invention provides an antenna for a portable terminal, capable of installing an NFC antenna without any separate installation space.

Also, the present invention provides an antenna for a portable terminal, capable of installing added functions without increasing the size of the terminal.

In addition, the present invention provides an antenna for a portable terminal, in which the antenna is interposed in a space where existing components are installed, thus contributing to the slim profile and lightweight without increasing the volume of the terminal.

Further, the present invention provides an antenna for a portable terminal, which does not need an interference avoiding element due to an expensive NFC antenna radiator and its installation.

According to an aspect of the present invention, there is provided an antenna for a portable terminal including a keypad assembly having a plurality of key buttons; a main antenna unit; and another antenna unit where a predetermined pattern is formed, with the other antenna unit being interposed between components of the keypad assembly.

According to another aspect of the present invention, there is provided a pad assembly for a portable terminal, including a main board installed inside the terminal, the main board including metal domes spaced apart from one another by a predetermined distance; a keypad rubber formed on the main board, the keypad rubber including contact protrusions corresponding to the metal domes; an antenna sheet formed on the keypad rubber and in which a conductive pattern with a predetermined size and a predetermined shape is formed; and a keypad sheet, formed on the antenna sheet and in which the key buttons corresponding to the respective contact protrusions are installed or formed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detail description of well-known features will be omitted for conciseness.

Figure 1:
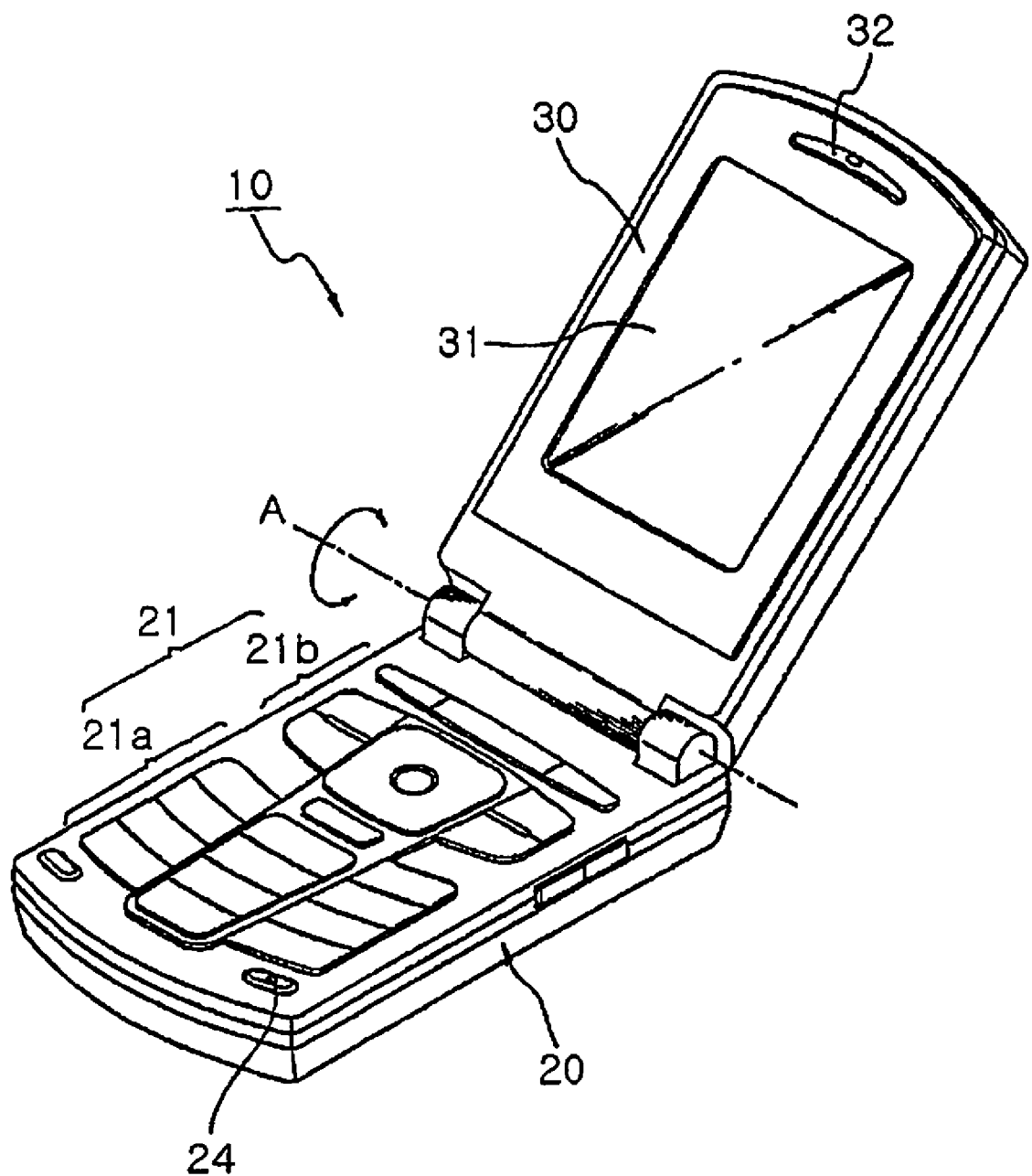
FIG. 1 is a perspective view of a portable terminal having a keypad assembly according to the present invention.

FIG. 1 is a perspective view of a portable terminal 10 having a keypad assembly according to the present invention. Specifically, a folder type terminal is illustrated in FIG. 1. The present invention can be applied to various types of terminals including a keypad assembly with a plurality of key buttons that are manipulated by users.

Referring to FIG. 1, the folder type terminal 10 includes a main body 20 and a folder 30. The folder is rotatable around a rotational shaft A and is opened from the main body at a predetermined angle. The main body 20 includes a keypad assembly 21 having a plurality of key buttons. The keypad assembly 21 may include a 3×4 numeric keypad assembly 21a and a navigation keypad assembly 21b. The 3×4 numeric keypad assembly 21a can be used to make a phone call by pressing the numeric keys. The navigation keypad assembly 21b can be manipulated to use a variety of additional features, such as a camera module, a music listening device, and the Internet. A microphone 24 may be installed below the keypad assembly 21 to send a voice to the other calling party.

A display unit 31 may be installed in the front surface of the folder 30. A high-definition color LCD module may be used for the display unit 31. Also, a speaker 32 may be installed above the display unit 31 to output a voice of the other calling party.

Although not shown in FIG. 1, a main antenna may be installed in a suitable location of the terminal. Although a built-in antenna mounted on a rear surface of a main board of the main body of the present invention, the present invention is not limited to the built-in antenna. The present invention relates to a separate antenna other than a built-in antenna or a retractable antenna protruding from the terminal. In addition, the antenna of the present invention is provided in a thin sheet type and is interposed between components of the keypad assembly 21. Therefore, the interference of the antenna can be avoided. Moreover, the antenna of the present invention is electrically connected to a feeder part of a Near Field Communication (NFC) module of the main board.

Figure 2:
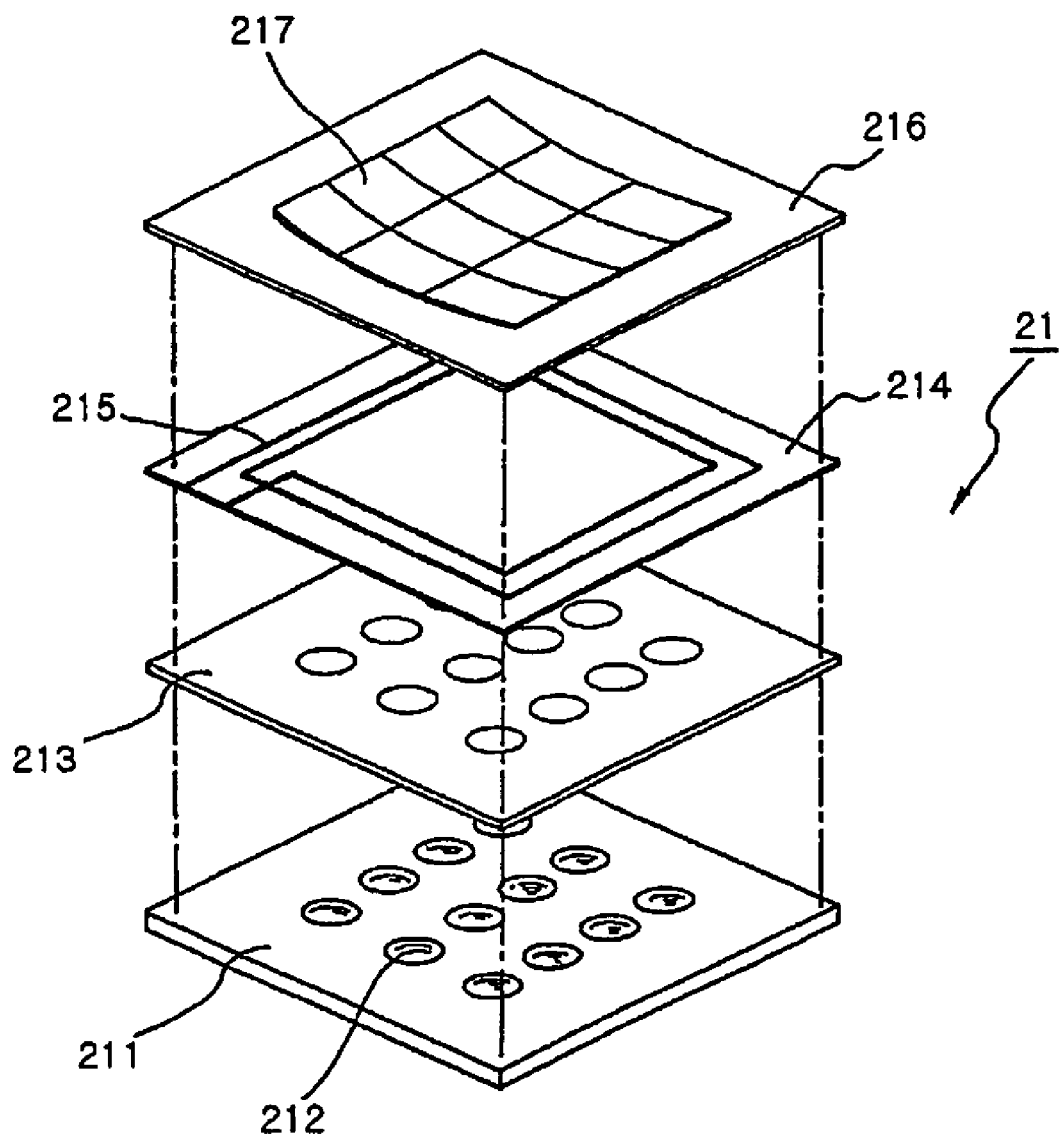
FIG. 2 is an exploded perspective view of the keypad assembly illustrated in FIG. 1.
Figure 3:
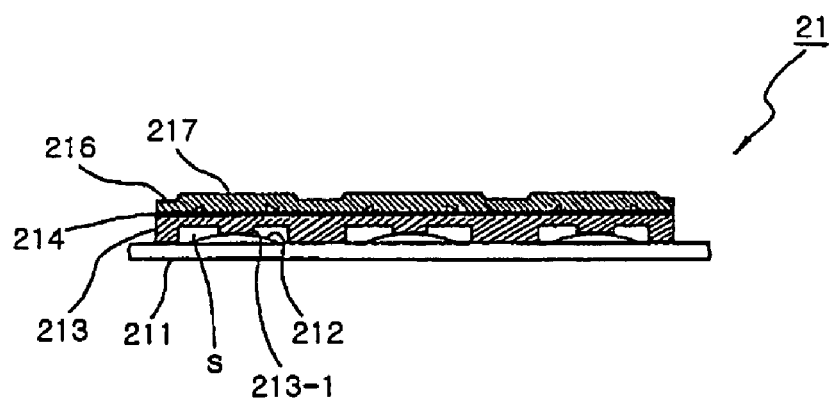
FIG. 3 is a sectional view of the keypad assembly illustrated in FIG. 2.

FIG. 2 is an exploded perspective view of the keypad assembly 21 according to the present invention. FIG. 3 is a sectional view of the keypad assembly illustrated in FIG. 2. Although components of a 3×4 numeric keypad assembly and an antenna sheet are illustrated in FIGS. 2 and 3, the present invention is not limited to this configuration. In the case of a keypad assembly in which a 3×4 numeric keypad assembly and a navigation keypad assembly are integrally formed, an antenna sheet may be expanded so that it can be shared by the numeric keypad assembly and the navigation keypad assembly.

The keypad assembly 21 of the present invention includes a main board 211 installed in the main body of the terminal. In addition, a keypad rubber 213, an antenna sheet 214, and a keypad sheet 216 are sequentially stacked on the main board 211. The keypad sheet 216 has a plurality of key buttons 217.

The main board 211 includes metal domes 212 installed at positions corresponding to the key buttons 217 of the keypad sheet 216. The metal domes 212 serve as a switching element to recognize button manipulation of the terminal by electrically connecting carbon contact points, spaced apart from one another in the main board 211.

The keypad rubber 213 is preferably formed of silicon material, and contact protrusions 213-1 are formed at positions corresponding to the metal domes 212. A space S is defined around the contact protrusions 213-1 in a skirt shape, such that the metal domes 212 can be smoothly pressurized by the protrusions 213-1.

A conductive pattern 215 with a predetermined shape may be formed in the antenna sheet 214. Although a Near Field Communication (NFC) antenna pattern is illustrated in FIG. 2, the present invention is not limited thereto. For example, existing Bluetooth™ antenna patterns or wireless local access network (WLAN) antenna radiators may be formed individually or may be integrally formed spaced apart from one another by a predetermined distance.

The keypad sheet 216 may be formed of silicon and a plurality of plastic key buttons 217 may be attached to the key sheet 216. Also, the keypad rubber 213, the antenna sheet 214, the keypad sheet 216, and the keypad buttons 217 may be bonded together by an adhesive.

Accordingly, as illustrated in FIG. 3, when the user presses the key buttons 217, the corresponding contact protrusions 213-1 of the keypad rubber 213 are pressed through the antenna sheet 214. The contact protrusions 213-1 pressurize the metal domes 212 on the main board 211 and therefore the corresponding carbon contact points of the main board 211 are electrically connected by the metal domes 212.

Under this arrangement, patterns may be formed on the antenna sheet 214 in a shape of an existing flexible printed circuit (FPC), or conductive patterns may be formed on a polyimide dielectric. Therefore, the antenna sheet 214 must have good flexibility. Further, due to the keypad rubber 213 formed by an insulating material, the antenna sheet 214 of the present invention is naturally spaced apart from a conductor such as a ground portion of the main board 211. Thus, it is unnecessary to install a separate insulator for avoiding the interference.

Figure 4:
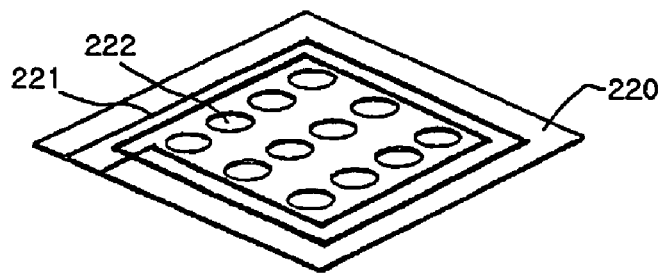
FIG. 4 is a perspective view of an antenna sheet according to another embodiment of the present invention.
Figure 5:
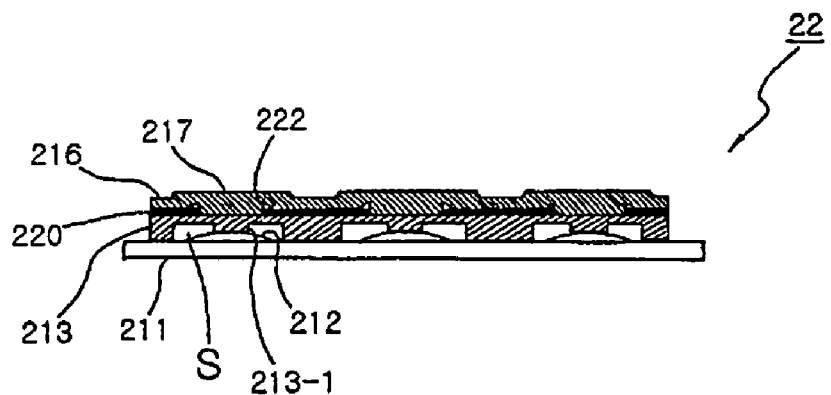
FIG. 5 is a sectional view of a keypad assembly having the antenna sheet illustrated in FIG. 4.

FIG. 4 is a perspective view of an antenna sheet according to another embodiment of the present invention. FIG. 5 is a sectional view of a keypad assembly having the antenna sheet illustrated in FIG. 4. The antenna sheet may have penetration holes 222 through which the corresponding contact protrusions can pass. Generally, since the NFC antenna radiator 221 occupies a relatively large area, it may be formed to bypass the holes 222. Accordingly, as illustrated in FIG. 5, a lower portion of the keypad sheet 216 passes through the penetration holes 222 of the antenna sheet 220 and contacts an upper portion of the corresponding contact protrusion 213-1 of the keypad rubber 213. Therefore, when pressing the key buttons 217, the user can feel a more flexible click of key buttons.

Figure 6:
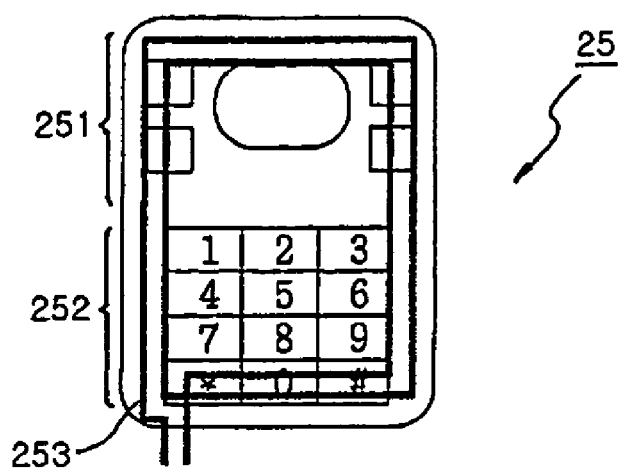
FIGS. 6 and 7 are views of antenna sheets according to further embodiments of the present invention.
Figure 7:
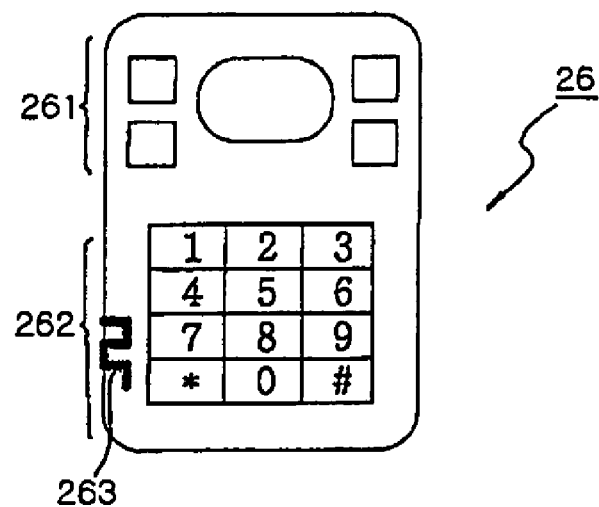

FIGS. 6 and 7 are views of antenna sheets according to further embodiments of the present invention. Referring to FIG. 6, since penetration holes are not formed in the antenna sheet 25, a pattern 253 may partially pass through a numeric key part 252 and a navigation key part 251. In this case, the pattern 253 can be used for an NFC antenna radiator requiring a relatively large area.

Referring to FIG. 7, a relatively small pattern 263 is formed in the left side of the numeric key part 262, except the navigation key part 261. In this case, the pattern 263 may be suitable for Bluetooth™ antenna radiator or Wireless Local Area Network (WLAN) antenna radiator.

The NFC antenna of the present invention is interposed between components of the key button assembly in a sheet type. Consequently, a separate installation space for the antenna radiator is not required in the main board, resulting in volume reduction of the terminal. Also, since an installation area corresponding to the total area of the keypad assembly is available, two or more antennas with different bands can be installed.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An antenna for a portable terminal comprising:
   a main board installed inside the terminal, the main board including metal domes spaced apart from one another by a predetermined distance;
   a keypad assembly having a plurality of components;
   a main antenna unit; and
   a second antenna unit,
   wherein a predetermined pattern is formed on an antenna sheet according to the predetermined distance between the metal domes, the second antenna unit being interposed between components of the keypad assembly.

2. The antenna of claim 1, wherein the keypad assembly comprises:
   a plurality of key buttons;
   a keypad rubber formed on the main board, the keypad rubber including contact protrusions corresponding to the metal domes; and
   a keypad sheet formed on the keypad rubber and in which the key buttons corresponding to the respective contact protrusions are at least one of installed and formed on the keypad sheet, the antenna being interposed between the keypad rubber and the keypad sheet in a sheet type.

3. The antenna of claim 2, wherein the antenna sheet and the keypad sheet, sequentially formed on the keypad rubber in the main board, are bonded together.

4. The antenna of claim 3, wherein the antenna sheet is a flexible printed circuit (FPC) sheet or a polyimide sheet where conductive pattern with a predetermined shape is formed at a predetermined position.

5. The antenna of claim 4, wherein the pattern formed in the antenna sheet bypasses positions corresponding to the metal domes.

6. The antenna of claim 4, wherein the pattern is formed in the antenna sheet regardless of positions corresponding to the metal domes.

7. The antenna of claim 5, wherein the antenna sheet includes penetration holes at the positions corresponding to the metal domes, thereby reinforcing a button operation characteristic.

8. The antenna of claim 6, wherein the keypad assembly includes a 3×4 numeric keypad assembly and a navigation keypad assembly, and the antenna sheet is installed over at least one of a part and a whole of at least one of the 3×4 numeric keypad assembly and the navigation keypad assembly.

9. The antenna of claim 7, wherein the keypad assembly includes a 3×4 numeric keypad assembly and a navigation keypad assembly, and the antenna sheet is installed over at least one of a part and a whole of at least one of the 3×4 numeric keypad assembly and the navigation keypad assembly.

10. The antenna of claim 8, wherein the pattern formed in the antenna sheet has a shape of a Near Field Communication (NFC) antenna radiator with a relatively large size compared to the size of the antenna sheet.

11. The antenna of claim 10, wherein the pattern formed in the antenna sheet is at least one of an NFC antenna radiator, a Bluetooth™ antenna radiator, and a Wireless Local Access Network (WLAN) antenna radiator, which are spaced apart by a predetermined distance.

12. A keypad assembly for a portable terminal, comprising:
    a plurality of key buttons;
    a main board installed inside the terminal, the main board including metal domes spaced apart from one another by a predetermined distance;
    a keypad rubber formed on the main board, the keypad rubber including contact protrusions corresponding to the metal domes;
    an antenna sheet formed on the keypad rubber and in which a conductive pattern with a predetermined size and a predetermined shape is formed according to the predetermined distance between the metal domes; and
    a keypad sheet formed on the antenna sheet and in which the key buttons corresponding to the respective contact protrusions are at least one of installed and formed on the keypad sheet.

13. The keypad assembly of claim 12, wherein the pattern formed in the antenna sheet bypasses positions corresponding to the metal domes.

14. The keypad assembly of claim 12, wherein the pattern is formed in the antenna sheet not considering positions corresponding to the metal domes.

15. The keypad assembly of claim 13, wherein the antenna sheet includes penetration holes at the positions corresponding to the metal domes, thereby reinforcing a button operation characteristic.

16. The keypad assembly of claim 14, wherein the keypad assembly includes a 3×4 numeric keypad assembly and a navigation keypad assembly, and the antenna sheet is installed over at least one of a part and whole of at least one of the 3×4 numeric keypad assembly and the navigation keypad assembly.

17. The keypad assembly of claim 15, wherein the keypad assembly includes a 3×4 numeric keypad assembly and a navigation keypad assembly, and the antenna sheet is installed over at least one of a part and whole of at least one of the 3×4 numeric keypad assembly and the navigation keypad assembly.

18. The keypad assembly of claim 17, wherein the pattern formed in the antenna sheet has a shape of a Near Field Communication (NFC) antenna radiator with a relatively large size.

19. The keypad assembly of claim 18, wherein the pattern formed in the antenna sheet is at least one of an Near Field Communication (NFC) antenna radiator, a Bluetooth™ antenna radiator, and a Wireless Local Access Network (WLAN) antenna radiator, which are spaced apart by a predetermined distance.

20. A portable terminal comprising:
    a main board installed inside the terminal, the main board including metal domes spaced apart from one another by a predetermined distance;
    a keypad assembly having a plurality of components;
    a main antenna unit; and
    a second antenna unit interposed between components of the keypad assembly, wherein a conductive pattern is formed on an antenna sheet according to the predetermined distance between the metal domes.

21. A portable terminal, comprising:
a main board installed inside the terminal, the main board including metal domes spaced apart from one another by a predetermined distance;
a keypad rubber formed on the main board, the keypad rubber including contact protrusions corresponding to the metal domes;
an antenna sheet formed on the keypad rubber and in which a conductive pattern with a predetermined size and a predetermined shape is formed according to the predetermined distance between the metal domes; and
a keypad sheet formed on the antenna sheet and in which a plurality of key buttons corresponding to the respective contact protrusions are at least one of installed and formed in the keypad sheet.

* * * * *